US006397195B1

(12) United States Patent
Pinard et al.

(10) Patent No.: US 6,397,195 B1
(45) Date of Patent: May 28, 2002

(54) SYSTEM FOR MANAGING ACCOUNTING INFORMATION IN A MULTI-DIMENSIONAL DATABASE

(75) Inventors: Jeffery S. Pinard, Stamford; Katheryn Kemper, Weston, both of CT (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 0 days.

(21) Appl. No.: 09/089,693

(22) Filed: Jun. 3, 1998

Related U.S. Application Data

(60) Provisional application No. 60/051,039, filed on Jun. 27, 1997.

(51) Int. Cl.$^7$ ............................................. G06F 17/60
(52) U.S. Cl. ............................... 705/30; 705/1; 235/379; 708/134; 708/163; 707/3; 707/4
(58) Field of Search ............................ 705/30, 34, 36, 705/1, 11; 707/3, 4; 345/440; 40/109; 235/379; 708/134, 163

(56) References Cited

U.S. PATENT DOCUMENTS

| | | | | |
|---|---|---|---|---|
| 4,187,629 A | * | 2/1980 | Yamada | 40/109 |
| 4,989,141 A | * | 1/1991 | Lyons et al. | 705/36 |
| 5,189,608 A | | 2/1993 | Lyons et al. | 705/30 |
| 5,504,676 A | * | 4/1996 | Domen et al. | 705/30 |
| 5,719,826 A | | 2/1998 | Lips | 368/29 |
| 5,778,346 A | * | 7/1998 | Frid-Nielsen et al. | 705/9 |
| 5,794,234 A | * | 8/1998 | Church et al. | 707/4 |
| 5,799,286 A | * | 8/1998 | Morgan et al. | 705/30 |
| 5,815,829 A | * | 9/1998 | Zargar | 705/30 |
| 5,894,311 A | * | 4/1999 | Jackson | 345/440 |
| 6,029,145 A | * | 2/2000 | Barritz et al. | 705/34 |
| 6,032,131 A | * | 2/2000 | Vogel | 705/30 |

FOREIGN PATENT DOCUMENTS

| | | | |
|---|---|---|---|
| EP | 244625 A1 | * 11/1987 | G06F/13/14 |
| WO | WO 96/34472 | 10/1996 | |

OTHER PUBLICATIONS

FRx Exhibits at Made2Manage users Conference; FRx's Leading Financial Integration Capabilities meet Made2Manage Users Needs for Comprehensive Financial Reports, Business Wire, Inc., 1998 edition, Oct. 21, 1998, 5–6.*
Dialog file 9, 01170269, Anonymous, Client/Server Finanical Accounting, Management Accounting–London, V74n2, pp. 11, Feb. 1996.*
Scannel, Ed "time server switches among time frames: variety of fiscal calendars included". Infoworld, V14, n37 p 18(1), Sep. 1992.*
Daniel, Dianne "Ca unveils next generation financial software". Computing Canada, v15, n10, p 11(1), Sep. 1992.*
"Date Input Converted Automatically to Scientific Time", *IBM Technical Disclosure Bulletin*, vol. 32, No. 10B, Mar. 1990, p. 343.
"Era Date Support for Single and Multiple Calendar Cultures," *IBM Technical Disclosure Bulletin*, vol. 34, No. 9, Feb. 1992, p. 33–37.

* cited by examiner

*Primary Examiner*—Eric W. Stamber
*Assistant Examiner*—Raquel Alvarez
(74) *Attorney, Agent, or Firm*—Barry R. Lipsitz; Douglas M. McAllister

(57) ABSTRACT

A method and apparatus are provided for managing accounting information of entities having different fiscal calendars. A memory stores accounting data for at least two entities, each of the entities maintaining the accounting data according to a different fiscal calendar. A user interface enables a user to request consolidated accounting information for the entities. Accounting data and/or calendar information of the entities is mapped to a base calendar maintained in the computer system. A processor is provided for accessing the accounting data according to the base calendar instead of the entity calendars to recover, for a specified time period, accounting information responsive to a user request entered via the user interface. The processor consolidates the accounting information for the different entities according to said base calendar.

14 Claims, 3 Drawing Sheets

PERIODS:

| Base Template | 1 | 2 | 3 | 4 | 5 | 6 | 7 | 8 | 9 | 10 | 11 | 12 |
|---|---|---|---|---|---|---|---|---|---|---|---|---|
| Base Template Time Slices | JAN | FEB | MAR | APR | MAY | JUN | JUL | AUG | SEP | OCT | NOV | DEC |

20

| Calendar 1 Periods | 1 | 2 | 3 | 4 | 5 | 6 | 7 | 8 | 9 | 10 | 11 | 12 |
|---|---|---|---|---|---|---|---|---|---|---|---|---|

22

| Calendar 2 Periods | Offset | | | 1 | 2 | 3 | 4 | 5 | 6 | 7 | 8 | 9 | 10 | 11 | 12 |
|---|---|---|---|---|---|---|---|---|---|---|---|---|---|---|---|

24

PERIODS:

| Base Template | 1 | 2 | 3 | 4 | 5 | 6 | 7 | 8 | 9 | 10 | 11 | 12 |
|---|---|---|---|---|---|---|---|---|---|---|---|---|
| Base Template Time Slices | JAN | FEB | MAR | APR | MAY | JUN | JUL | AUG | SEP | OCT | NOV | DEC |

↙ 20

| Calendar 1 Periods | 1 | 2 | 3 | 4 | 5 | 6 | 7 | 8 | 9 | 10 | 11 | 12 |
|---|---|---|---|---|---|---|---|---|---|---|---|---|

↙ 22

| Calendar 2 Periods | Offset | | | | | | 1 | 2 | 3 | 4 | 5 | 6 | 7 | 8 | 9 | 10 | 11 | 12 |
|---|---|---|---|---|---|---|---|---|---|---|---|---|---|---|---|---|---|---|

SYSTEM FOR MANAGING ACCOUNTING INFORMATION IN A MULTI-DIMENSIONAL DATABASE

This application claims the benefit of U.S. Provisional Application No. 60/051,039 filed Jun. 27, 1997, the entire disclosure of which is incorporated herein by reference.

A CD-ROM entitled "Appendices 1 through 5 for SYSTEM FOR MANAGING ACCOUNTING INFORMATION IN A MULTI-DIMENSIONAL DATA BASE" containing Appendices 1–5 is made a part hereof and is incorporated herein by reference. The CD-ROM contains the following files:

| File Name | Size (KB) | Date of Creation |
| --- | --- | --- |
| Appendix 1.xls | 29 KB | March 30, 1998 |
| Appendix 2.doc | 11 KB | March 30, 1998 |
| Appendix 3.doc | 11 KB | March 30, 1998 |
| Appendix 4.doc | 75 KB | March 30, 1998 |
| Appendix 5.doc | 14 KB | March 30, 1998 |

BACKGROUND OF THE INVENTION

The present invention relates to the integration of on-line analytical processing (OLAP) technology into computer software accounting products. In particular, the invention enables the consolidation of accounting data among multiple companies that have different beginning and ending fiscal calendars.

In the past, when viewing consolidated statements that have come from aggregations having companies with different beginning and ending calendars, information requested over a given time period did not account for the different calendars. This resulted in inaccurate information being reported for the time period of interest.

In designing an integrated system to introduce OLAP functionality in accounting applications, it is important to provide a seamless transfer of data between the accounting transaction database and the OLAP multidimensional database. This should be accomplished transparently to the end user at the conclusion of transactional processing. Moreover, it would be advantageous to provide an implementation that enhances the granularity of data that an accountant can analyze. Such an implementation should incorporate accounting requirements including retained earnings, net income, and companies that have different fiscal calendars.

When designing a multidimensional database application, the designer must specify a set of dimensions. Each dimension will contain a set of elements. The elements within a dimension can be organized in a hierarchy. This design effort is analogous to the design effort that takes place when designing a relational database application. In the case of relational database applications, the result of the design effort yields a database schema. In a multidimensional database, the result yields a "cube". Relational databases use internally defined "keys" to provide the end user with the ability to request values very quickly. In the multidimensional database, values (such as an accounting balance) are provided by specifying an element for each dimension.

The flexibility and usefulness of the analysis and reporting in a multidimensional database will depend on the design and contents of the cube. The present invention provides an OLAP "Accounting Cube" with unique design characteristics including:

1. The design of a Time dimension that incorporates a mechanism for handling a set of companies that use different fiscal calendars, and accommodates the unique requirements of retained earnings and net income reporting; and 2. The design of a Balance and Value dimension that defines a set of elements that allow for a very flexible and powerful reporting and analysis environment. The accounting cube represents the actual multidimensional database that stores metadata and balances that have been replicated from a host accounting application.

SUMMARY OF THE INVENTION

In accordance with the present invention, a method is provided for operating a computer system to manage accounting information of entities having different fiscal calendars. A user input is received in said computer system requesting consolidated accounting information for at least two entities that maintain accounting data according to respective calendars. Calendar information of said entities is mapped to a base calendar maintained in said computer system. Calendar elements from said base calendar are then used instead of calendar elements from the entity calendars to recover, for a specified time period, accounting information maintained in said computer system for the entities.

The calendar information for at least two of the entities can be based on a different fiscal year. In such a situation, the mapping and use of the base calendar are preferably performed by said computer system in a manner that is transparent to a user requesting the consolidated accounting information. In such an embodiment, the computer system will provide the consolidated accounting information to the user without further user intervention, and without the user even having to know that the disparate calendars have been accounted for by reliance on a base calendar maintained by the computer system.

Once the appropriate accounting information is recovered by the computer system in response to a user input and the "behind the scenes" processing performed by the computer, the recovered accounting information for the entities is consolidated. The consolidated information is then presented to the user, e.g., in the form of a report that is displayed on a monitor or which is printed or otherwise output for review by the user.

The consolidated information can comprise, for example, a consolidation for the specified time period of at least one of net income and retained earnings for the entities. Moreover, the computer system can provide on-line analytical processing and consolidation of the accounting information in response to user inputs.

A computer system is disclosed for managing accounting information of entities having different fiscal calendars. The computer system comprises memory for storing accounting data for at least two entities. Each of the entities maintains its accounting data according to a respective calendar. A user interface is provided for enabling a user to request consolidated accounting information for the entities. Means are provided for mapping accounting data and/or calendar information maintained according to the respective calendars of the entities to a base calendar maintained in said computer system. A processor is provided for accessing the accounting data according to the base calendar instead of the entity calendars to recover, for a specified time period, accounting information responsive to a user request entered via the user interface. The processor consolidates the accounting information for the different entities according to the base calendar.

Typically, the calendar information for at least two of the entities will be based on a different fiscal year. The mapping means and processor correlate the different fiscal years to the base calendar for presentation in a manner that is transparent to a user requesting said consolidated accounting information.

The computer system in the illustrated embodiment is responsive to a user input received via the user interface for consolidating the recovered accounting information for the entities and reporting the consolidated information to a user. The consolidated information can comprise a consolidation for the specified time period of at least one of net income and retained earnings for the entities. Moreover, the computer system can provide on-line analytical processing and consolidation of the accounting information in response to user inputs.

BRIEF DESCRIPTION OF THE DRAWINGS

FIG. 3 illustrates the mapping of two different calendar periods to a base calendar in accordance with the present invention.

DETAILED DESCRIPTION OF THE INVENTION

The present invention provides various benefits to a computerized accounting system using a novel accounting cube. The accounting cube enhances the granularity of data than an accountant can analyze. Moreover, it incorporates accounting requirements including retained earnings, net income, and companies that have different fiscal calendars.

When designing a multidimensional database application, a set of "dimensions" must be specified, each containing a set of elements. Specifying an element for each dimension will yield a value, e.g., an accounting balance. The flexibility and usefulness of a computer implemented analysis and reporting application for accounting purposes will depend on the design and contents of the corresponding accounting cube and the dimensions it specifies. Flexibility and usefulness is improved in accordance with the invention by, inter alia, the novel provision of "time" and "balance and value", dimensions in the accounting cube.

Meaningful accounting information is obtained from several basic accounting components. These include the components set forth in Table 1.

TABLE 1

| Information Type | Time | Symbol | Description |
| --- | --- | --- | --- |
| Periodic Activity | Prior Periods | A | Periodic activity that has occurred in periods prior to the current period. |
| Periodic Activity | Current Period | B | Periodic activity that has occurred in the current period. |

TABLE 1-continued

| Information Type | Time | Symbol | Description |
| --- | --- | --- | --- |
| Periodic Adjustment | Prior Periods | C | Periodic adjustments that have occurred in periods prior to the current period. |
| Periodic Adjustments | Current Period | D | Periodic adjustments that have occurred in the current period. |

Figure 1:
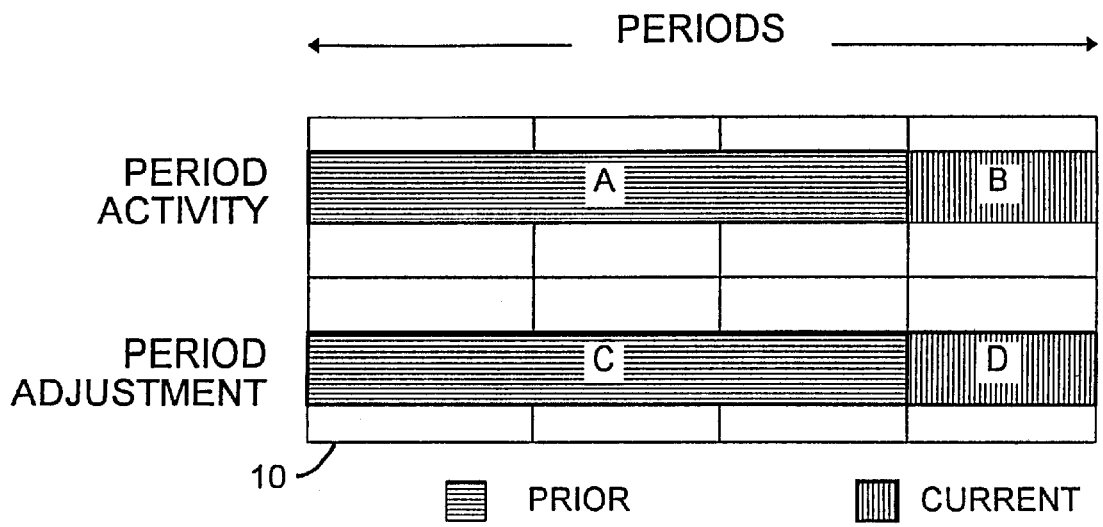
FIG. 1 is a time diagram showing prior and current period activity and period adjustment.
Figure 2:
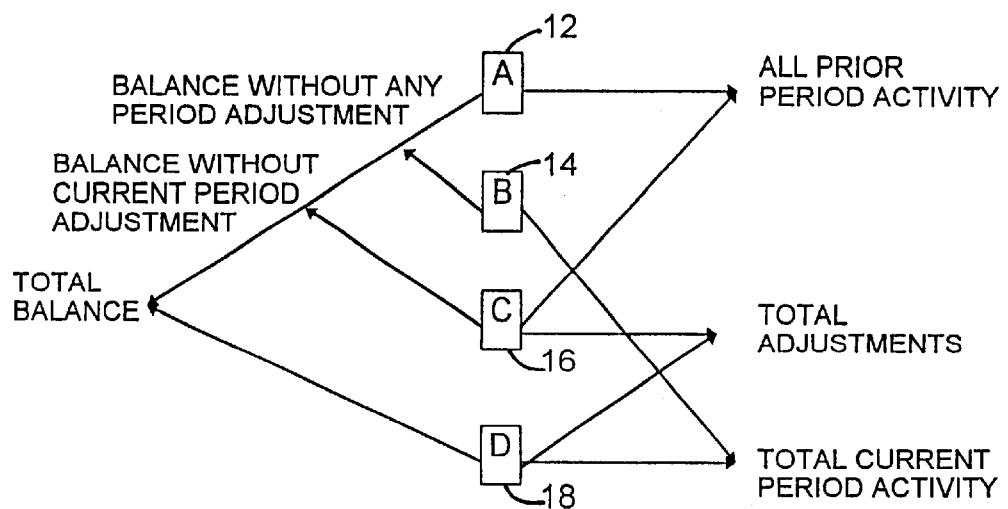
FIG. 2 is a diagram of a balance dimension of an accounting cube in accordance with the invention, incorporating the periods illustrated in FIG. 1.

The information set forth in Table 1 is illustrated in FIGS. 1 and 2. FIG. 1 comprises a time diagram 10 which illustrates period activity for prior and current periods A and B, respectively. It also illustrates prior and current adjustment periods C and D, respectively. The symbol A relates to periodic activity that has occurred in periods prior to a current period in time, such as prior to the current day, week, month, fiscal quarter, or the like. Symbol B relates to periodic activity that has occurred in the current period, e.g., today, the current week, the current month, the current fiscal quarter, etc. Symbol C relates to periodic adjustments that have occurred in periods prior to the current period, and therefore corresponds to adjustments made during the periodic activity represented by symbol A. Symbol D relates to periodic adjustments that were made during the current period, i.e., with respect to the periodic activity represented by symbol B.

FIG. 2 illustrates a Balance dimension which combines basic accounting information that can be derived from the period activity and period adjustment components illustrated in FIG. 1. In particular, the combination of prior period activity 12 (symbol A) and current period activity 14 (symbol B) enables the derivation of balances without any period adjustment. The addition of prior period adjustments 16 (symbol C) enables the derivation of balances without a current period adjustment. The addition of current period adjustments 18 (symbol D) allows a total balance to be computed.

Referring to the right hand side of FIG. 2, the combination of prior period activity 12 and prior period adjustments 16 enables the derivation of all prior period activity. The combination of prior period adjustments 16 and current period adjustments 18 enables the derivation of the total adjustments. The combination of the current period activity 14 and the current period adjustments 18 enables the derivation of total current period activity.

When analyzing balance information it is important to keep in mind that there are two types of balances with different properties of actions; namely, "balance sheet" and "flow" accounts. Balance Sheet accounts always will return the value to date of a particular account. For example a common bank account is a type of a balance account. Whenever the account holder inquires "how much money do I have", the inquiry is always prefaced with a point in time. The answer is what amount resides in the account at the specified point in time, i.e., the "balance." Other examples include;

What is the balance for my bank account at the end of March?

How much money did I deposit in March?

What was my balance in the beginning of March?

Examination of these examples shows that the inquirer is asking for different views of his bank account.

From an OLAP perspective, information associated with an account balance is typically organized as follows:

To get information for account x for March:

March Balance, Total Balance—What is the balance for my bank account for March?

March's Activity, Current Period Activity—How much did I deposit/withdraw in March?

Prior to March Balance, Prior Period Activity—What was my balance in the beginning of March?

The above example indicates that the March Balance is actually derived as the summary of Current Period Activity 14 and Prior Period Activity 12. This corresponds to the "balance without any period adjustment" category of FIG. 2. Balances may be viewed by different frequencies such as Quarter to Date, Year to Date, etc. For balance accounts, the balance for the last period of the frequency requested is always provided. This behavior must be handled by the reporting tools used, or specially constructed or derived time elements must be provided to retrieve this information.

Flow accounts differ from balance accounts in that their natural value happens to be the activity for the period requested. Flow accounts are not affected by what has happened before the period requested. Expenses for a corporate department are an example of a flow account.

Flow accounts always will return the current activity for a particular account. For example, in the case of the expenses for a department, the inquiry "how much money have I spent?" must always be prefaced with a point in time. The answer is the current period activity balance for the specified time period. Other examples include:

What is the total balance through March for this department?

How much money was spent in March?

What is the total balance through March for this department for this fiscal year?

If this information is considered from an OLAP perspective, the following results will be seen:

Information for flow account x for March:

March Balance, Total Balance—What is the balance for my expense account for March?

March's Activity, Current Period Activity—How much did I spend in March?

Prior to March Balance, Prior Period Activity—What was my balance in the beginning of March?=0

Note that the hierarchy for the balance account and flow accounts are identical. However, when flow accounts are written to the accounting cube, the prior period activity will always be zero for the flow account. In this aspect, the behavioral differences between flow and balance accounts is controlled.

To view different frequencies (Quarter to Date, Year to Date, etc.) with flow accounts in accordance with the present invention, aggregations in the Time dimension are used that add up the activity for the requested range and return a number analogous to a balance account. Together, the Balance dimension and Time dimension provide a powerful analytical resource that has not been previously available.

The Time dimension of the present invention can best be explained by reference to the following example:

Basic Time Structure

A simple time structure is an aggregation or roll-up of individual periods that corresponds to a fiscal time calendar. A basic time structure for a year may look like this:

- 1996
  - 1996 Half 1
    - Quarter 1
      - January
      - February
      - March
    - Quarter 2
  - 1996 Half 2
    - Quarter 3
    - Quarter 4

Information in periods have a hierarchical structure; months add up to quarters, quarters to half years, and half years to years. This allows information to be viewed based on the frequency requested.

In addition to this basic roll-up, there are specifications for Quarter to date ("QTD"), half to date ("HTD") and life to date ("LTD") aggregations. The QTD aggregation can be expressed as follows:

March Quarter to date
  January
  February
  March

With these types of aggregations defined, it is possible to look at information for March by period, then switch the point of view to March QTD, March HTD, or March LTD. For balance accounts no changes will be seen (a balance is a balance; this is enforced through the report viewer intelligence to prevent unpredictable results). For flow accounts, however, one will see balance information that resembles balance sheet accounts, or the aggregation of the activity for the periods requested.

It is important to remember that balance and flow accounts have different behavioral characteristics. For example, with the accounting cube all of the correct information needed to be retrieved can be obtained. There is a caveat in that some of the aggregates for time bring back undesired results for balance accounts if they are used. These are masked out by the reporting tool in order to shield the user from the account differences. Just as straight queries against a traditional relational database will bring back unpredictable results if the user is unfamiliar with the underlying structure and implementation, the same holds true here. A "smart user" who knows the cube can bring back all the correct information, whereas an "unfamiliar user" might get results that seem strange. An effective reporting tool helps the "unfamiliar user" get understandable results. The unpredictable results mentioned here are a small percentage of all possible calculations.

Multiple Dissimilar Fiscal Calendars

An added complexity occurs in enterprise accounting systems that have multiple companies with different beginning and ending fiscal calendars. For example:

Company 1 has a fiscal calendar that begins in July and ends in June, and

Company 2 has a fiscal calendar that begins in January and ends in December.

When viewing consolidated statements that have come from aggregations having companies with different beginning and ending calendars, the Time dimension described above ("Basic Time Structure") will not provide the information needed. To solve this problem, the scheme of the present invention:

1. Provides a mapping mechanism that derives the calendar structure based on an accounting time template defined in the transaction system, and 2. Adds a layer of abstraction away from the periods, allowing capture of information in a similar fashion (i.e., from the template calendar) and providing mappings based on derived fiscal calendars that provide balance information in a desired format.

The mapping is accomplished by creating a number of elements in the Accounting Cube (referred to herein as "@Base" elements that correspond to the number of elements in the Host Accounting Application calendar template. For example, the Hyperion Accounting software products marketed by Hyperion Software Operations Inc., Stamford, Conn., USA (the assignee of the present invention), utilize the concept of a base calendar template for deriving and synchronizing actual calendars that are associated with companies. The base template will always have the maximum number of elements contained in the largest calendar. When actual calendars are created, they will map to the base calendar template.

For example, if a 12 period calendar is defined (i.e., 12 months), 12 @ base periods (@base01–@base12) will be provided. The mapping logic in the actual calendar associated with the fiscal year for a company is then used to map information from these base periods. The mapping logic is generated when the actual calendar is created. An example is provided in FIG. 3, where a base calendar 20 is defined such that the base periods 1 to 12 ("base template") correspond with the months January to December ("base template time slices"), respectively. A first calendar 22 ("Calendar 1") and a second calendar 24 ("Calendar 2") are also illustrated. As can be seen from FIG. 3, Calendar 2 is offset from Calendar 1 by six months. Thus, an entity having a January to December fiscal year would be represented by Calendar 1 and an entity having a July to June fiscal year would be represented by Calendar 2, as in the following example:

Calendar 1—January to December Calendar
(where base 1=January, Base 12=December)

- 1998
  - Half 1
    - Quarter 1
      - January     (Period 1)
        - @Base01
      - February    (Period 2)
        - @Base02
      - March       (Period 3)
        - @Base03
    - Quarter 2
  - Half 2
    - Quarter 3
    - Quarter 4

Note: @Base level elements are hidden from the user

Calendar 2—July to June Calendar
(where base 1=January, Base 12=December)

- 1998
  - Half 1
    - Quarter 1
      - July        (Period 1)
        - @Base07
      - August      (Period 2)
        - @Base08
      - September   (Period 3)
        - @Base09
    - Quarter 2
  - Half 2
    - Quarter 3
    - Quarter 4

With this type of a structure, when aggregations are computed the disparate fiscal calendar problem is solved by always going to the lowest common denominator, the base calendar, and deriving information from it. While there doesn't seem to be much happening at the first level (i.e. August=@Base08), the benefits are seen at the higher levels of aggregations such as quarters or years where Q1 for one calendar is @base 1–3 and Q1 for another calendar may be @Base 7–9. The naming conventions used here are purely for the user's convenience to know what they are looking at for a given entity and time period, and can be masked out through the @ character in a reporting tool.

Net Income & Retained Earnings

There is a special account that captures profit for a company. This is the retained earnings account. An enterprise can have a plurality of retained earnings accounts, as will be discussed in greater detail below. The balance of a retained earnings account will reflect the amount of earnings the company has had as of the last fiscal year close. This figure is constant throughout the current fiscal year. During the fiscal year the account accumulates Net Income, or profit for the current year. Net Income is variable throughout the year based on the activity in other accounts. At the end of a fiscal year, the net income is realized and added to the retained earnings figure to provide the new retained earnings value for the upcoming fiscal year. At this point, the net income figure is also zeroed out for the next fiscal year to start accumulating again.

The benefits of the inventive Value dimension elements are realized in connection with such retained earnings accounts. Normally, accounting systems track the retained earnings account only. Systems that do provide access to net income usually do so through roll-ups of account structures that try to determine what the net income should be based on the P&L accounts. Since "net income" represents "how well my company is doing this year," it would be advantageous if this information were easier to obtain. To do so, the present invention provides a Net Income element that contains the net income for the fiscal year based on the account that is being viewed. If only the retained earning account is being viewed, one will see how much net income has been accumulated to date for this year. If this account is a child of other accounts in a hierarchy, the net income attribute will be carried to the parent accounts. This way, net income is shown on an account by account basis or on an aggregate account.

The ability to indicate net income in this manner provides a great level of flexibility in accounting. A company can use more retained earning accounts and track different profits and losses (P&L's) at a more granular level if desired. Zeroing in on accounts or viewing through aggregate accounts is also possible. One can truly see what a company's performance is on a day by day basis as the normal accounting processes of paying invoices, creating journals etc. are happening and affecting earnings.

As will be appreciated by those skilled in the art, implementation of these features is pretty straightforward when dealing with companies that all have the same fiscal year calendar. However, this is not the case for companies of one fiscal calendar reporting to companies in a hierarchy that have a different calendar structure. If retained earnings reflect the value at year end, how does one obtain this information where one or more company calendars are skewed? Without such an ability, accurate reporting of consolidated companies with different fiscal structures, and creation of a consolidated financial report reflecting the companies' retained earnings and net income is not possible. This would cause difficulty for many large conglomerates.

To overcome this problem, the present invention takes into account the retained earnings of the child company as of the date of the parent calendar, by considering the Time dimension and elements in the roll-ups. In particular, when balances are written to the cube for the company's fiscal year, the system is analyzed to determine what other calendar structures are supported. "Offset" information is then written to these calendar structures for the entity. The offset information, when combined with the normal elements of the different calendar structure, will provide the correct net income and retained earnings figures for the consolidated entity of a different fiscal calendar.

The offset information to be written is based on the net income difference between the different calendar's year end to the detail company year end. This figure is negated to retained earnings (balance) offset figure at the beginning of the detail company year end and is also additive to,the net income (NI) of the offset. When the time period of the summary entity year end is hit, the net income from detail company year end and summary year end is taken, and this figure is added to the retained earnings (balance) and negated to net income (NI) of the offset. The detail company must write offset information for all calendars supported in the system (this only applies to retained earnings accounts).

As an example, assume twelve periods, one-hundred dollars of activity in net income each month, and a six month skewed calendar between the detail and summary companies. Assume further that the detail company starts year 1995 with $1200.00 in retained earnings. The value dimension would look like this:

Detail Company Calendar 01:

|  |  |
| --- | --- |
| Balance | 1200 |
| dr | 1200 |
| cr | 0 |
| Statistic | 0 |
| Net Income | 0 |

During the year, Net Income for the detail company would grow. At the end of period 1, it would be 100, then 200 etc. At the end of period 12 it would be 1200. After year end close, the Balance would be 2400 with Net Income back to 0.

Now, if we look at the summary entity with a six month skewed calendar, we would see the Value dimension for 1995 start of Calendar 01 (detail company's calendar) as follows:

|  |  |
| --- | --- |
| Balance | 600 |
| dr | 600 |
| cr | 0 |
| Statistic | 0 |
| Net Income | 600 |

When we get to period 7 (just after year end for summary entity) we would expect to see the following:

|  |  |
| --- | --- |
| Balance | 1800 |
| dr | 1800 |
| cr | 0 |
| Statistic | 0 |
| Net Income | 0 |

As indicated, for the first part of calendar 01, $-600 is offset for the balance of the retained earnings account and $+600 for the net income. When we get to the year end of the summary, we have $+600 to retained earnings and $-600 for the net income. It is thus seen that there are two pieces of offset information for both sides of the dissimilar calendar offset, and that these offset figures are constant throughout the periods that that describe the offset. It just so happens that in the example, the figure is 600 on both sides of the offset. If the example were changed to a detail calendar having 100$ per month for 1994, coming into 1995 with $1200 retained earnings and then doing $200 net income per period, we would see the first offset figure to be $600 and the second to be $1200. The figure is derived from the differences in the calendars and the net income accumulated during this period.

Calendar Structure for different calendars

In order to illustrate the processing of aggregate data for entities having disparate calendars, we take the calendar 2 structure described above and add the offset structure as follows:

July to June Calendar
(where base 1=January, Base 12=December)

| | |
|---|---|
| • 1996 | |
|   • Half 1 | |
|     • Quarter 1 | |
|       • July | (Period 1) |
|         • @Base07 | |
|         • @Offset07_Cal_02 | |
|       • August | (Period 2) |
|         • @Base08 | |
|         • @Offset07_Cal_02 | |
|       • September | (Period 3) |
|         • @Base09 | |
|         • @Offset07_Cal_02 | |
|     • Quarter 2 | |
|   • Half 2 | |
|     • Quarter3 | |
|     • Quarter4 | |

In this manner we are able to apply the offset information that has been written by a detail company for each calendar to the different calendar structures.

Together, the Time, Balance and Value dimensions and their elements provide a powerful analysis tool. An example of the use of these dimensions together follows:

If we take just one element from a time structure such as January_1998, we have a full range of Balance elements that we can look at, as shown in FIG. 2. Within each balance element in this structure, we have the full complement of the Value dimension and its elements. Such a Value dimension can comprise:

Value Dimension

|  |
| --- |
| Balance |
| Debit |
| Credit |
| Statistic |
| Net Income |

As can be seen, there is a tremendous amount of information and flexibility in the data and how it can be reported. Although just one time period is illustrated, if one looks at the aggregations of time and it's construct, the permutations of usable information becomes great. Data can be viewed as simplistically or in as great a detail as necessary, depending on the information desired. By storing information at this granular level and providing these structures, the intended benefits result.

The Accounting Cube can be implemented in any OLAP type database or data warehousing tool. In the case of the Hyperion Software accounting products, the Accounting Cube is implemented on Applix's TM1 OLAP Engine. Although this implementation makes API calls directly into the TM1 engine using the Applix 1.5 API, there is nothing to prevent this cube from being constructed in an alternate OLAP engine as long as the engine provides aggregate numbers based on hierarchies.

The Accounting Cube consists of:

Dimensions—keys that are used to get some value; and

Facts (or values)—typically a number that is associated with a set of keys or dimensions.

Dimensions consist of:

1. elements—a list of names that are valid for the dimension, and
2. hierarchical structure—the roll-up strategy that will be used by the OLAP database engine to add up values associated with elements.

The section below defines the source for how each of the dimensions are created.

Entity (a.k.a. Company) Elements

The entity dimension is common to enterprise level accounting packages. Typically, an accounting package will contain information on all companies or subsidiaries that do business under a larger umbrella company. This information can be derived from most enterprise level accounting systems.

Entity Hierarchical Structure

These companies are often arranged in a hierarchical manner that depicts the overall reporting structure, such as:

Company 1—Headquarters

Company 2—Division 1

Company 3—Division 2

Company 4—Division 3

This information can be derived from most enterprise level accounting systems.

Natural Account Elements

The Natural Account dimension typically holds the accounting categorization. For example, an accounting designation could be my "expense" account. The account classes (asset, liability, income, etc.) determine the behavioral characteristics of the account (i.e., flow vs. balance). This information can be derived from most enterprise level accounting systems.

Natural Account Hierarchical Structure

Natural Accounts, like entities, can be organized in a hierarchy. For example:

Total Expenses

Office Supplies

Hardware

T&E

Air Fare

Meals

Taxi

This information can be derived from most enterprise level accounting systems.

User Defined Account Segments Elements

User defined account segments are categorizations for balances that are useful to the accounting analyst. These additional segments enable the analyst to ask questions such as "What are my Expenses in the Eastern Region?" In this example, expenses would be booked to the "Expense" natural account and to the "Region" user defined segment. This information can be derived from most enterprise level accounting systems.

User Defined Account Segments Hierarchical Structure

Natural Accounts, like entities can be organized in a hierarchy. For example,

Total Region

East

West

North

South

This information can be derived from most enterprise level accounting systems.

Currency Elements

The currency elements consist of the definitions of all currencies that are supported in the system. This information can be derived from most enterprise level accounting systems. No hierarchy is required for currency elements.

Category Elements

Typically, accounting systems will support categories such as "Actual", "Budget", etc. This information can be derived from most enterprise level accounting systems. No hierarchy is required for category elements.

Time Elements

The Time dimension is constructed based on the information defined above. All accounting systems will have a time element that can be used to derive a Time dimension in OLAP. In order to implement the present invention, this Time dimension must be mapped to the time structure. The hierarchical structure for time must follow the definition above or a functional equivalent thereof.

Balance Elements

The balance elements have been described above. The balances must be mapped from the Host Accounting system to the Accounting Cube for each combination of elements identified in the balance and value dimensions. The balance hierarchy has been described above.

Value Elements

This dimension enables the user to view different "flavors" or granularity of balances. These elements are derived from the Accounting System, and this is the basis of where all debits/credits are stored. These are the actual elements described below.

Value Hierarchical Structure

Balance

Debit

Credit

Statistic

Net Income

This structure is defined in the Accounting Cube as it is described here.

Balances or Facts

Balances or facts are the numerical values that the user or analyst is looking for. To get a balance, the user must specify values for all keys or dimensions. The Value dimension allows the end user to view a fact in different "flavors" including debit or credit, net income, or statistic. Balances are replicated from the Host Accounting system. Every balance will have it's corresponding keys or dimensions that are associated and that identifies that value.

Normally the attributes for an account are Balance (with debit (dr) and credit (cr)) and/or statistic. In accordance with the present invention, an attribute for Net Income has been added to these accounts. If there is a retained earnings account, or one child is a roll-up, net income will be able to be seen for the account specified based on the current calendar context. If fiscal calendars are changed, the account balance and net income will be adjusted automatically to take the new fiscal structure into effect.

Case study Example—Data mapping and creating the cube

In this example there are two accounts for a company that has a calendar that is six months offset from the base calendar. Please refer to the CD-ROM appendices identified as follows:

- Appendix 1—Excel spreadsheet representing sample view of both balance and flow accounts through a different calendar
- Appendix 2—text document describing how to construct the balance dimension
- Appendix 3—text document describing how to construct the value dimension
- Appendix 4—text document describing how to construct the time dimension
- Appendix 5—recorded periodic activities for two accounts for 2 years worth of data. This is the data set represented in Appendix 1.

The data shown in Appendix 5 represent two accounts and their associated data for a two year period. This illustrates one possible starting point for implementing an accounting system with its base data. Account balances are essentially the sum of transaction documents (invoices, checks, etc.) that affect a balance for a specified period of time. In the present example, the host accounting system stores account balances as activity for a period, with each period representing only the activity that happened in that period. A beginning year anchor record (00) represents the beginning year balance for the account. Since accounting systems store information in different formats, it will be necessary to know how data is stored in a particular system in order to properly write the required information.

Both a flow account and a balance account are included in the illustrative data provided in the appendices. For the balance account, the activity of the type 0 and 1 period would be written to the elements Activity and CurAdj. The information for the beginning period balance in BOPB, BOPA would also be written based on the 00 record for the year plus the sum of the activities of the period up to the current point of view. For example, if information were written about period 4, the beginning balance would be the year00 record+period1+period2+period3. This rule would be followed from the first period during which the account has activity until the end of the calendar structure.

For a flow account, information is written to Activity and CurAdj only for the type 0 and 1 account. BOPB and BOPA are ignored for the flow account. Again, information for the first period that has activity is started and processing continues to the end of the calendar structure.

Within the balances that are written, the Balance and credit information in Appendix 5 is used to derive the debit. Credits and debits are only written to the Value dimension, and the balance is calculated from these.

The time period over which the information is written comprises the @Basexx_199x elements contained in Appendix 4. These capture the information at the template calendar level. The appropriate calendar can be derived from this information.

Once all of the information has been written, output such as contained in Appendix 1 can be generated.

Figure 4:
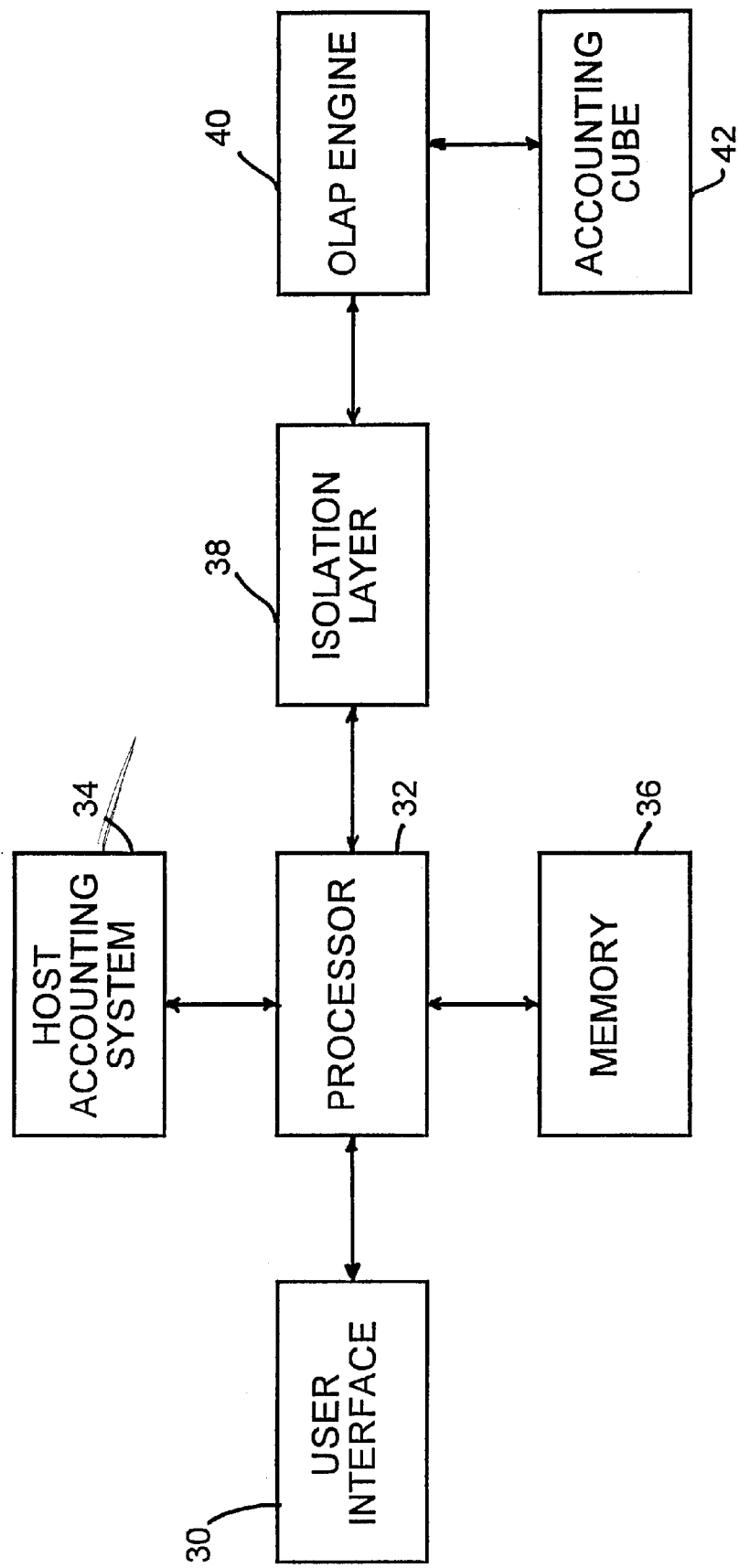
FIG. 4 is a block diagram of a computer system in accordance with the invention.

FIG. 4 illustrates a computer system in block diagram form in which the invention is implemented. A user interface 30 can comprise a computer keyboard and display, or any other interface well known in the art such as a voice or pen responsive user input device. User input from interface 30 is provided to a computer processor 32, which is responsive to user requests for extracting information from a database maintained by a host accounting system 34. Memory 36 is provided for use by the computer system to store software instructions, data, calculations and partial results as well known in the art.

In order to extract and report information to a user, including consolidated accounting data for different entities having disparate fiscal calendars, an accounting cube is provided in accordance with the invention. The accounting cube is a multidimensional database that stores the metadata and balances that have been replicated from the computer software application(s) ("host accounting application") used by the entities to maintain their accounting data. The accounting cube 42 can have its own dedicated memory, or can utilize system memory 36 to store the metadata and balances.

The accounting cube 42 and processor 32 communicate via an isolation layer 38 and OLAP engine 40. The isolation layer (which can be a part of the OLAP engine instead of a separate component as shown) will hide the specifics about the OLAP engine from any application or program that is trying to use it. The isolation layer can thereby provide OLAP engine independence from other system components, such as various application programming interfaces (APIs).

The OLAP engine can comprise any of the current or future OLAP engines well known in the art. The OLAP engine will typically store the accounting cube 42. Moreover, the OLAP engine will typically contain the database engine and the API that is used to construct and add metadata and balances to the database.

It should now be appreciated that the present invention integrates on-line analytical processing technology into accounting products. An accounting cube enhances the granularity of data that an accountant can analyze, and advantageously incorporates accounting requirements including retained earnings, net income, and entities that have different fiscal calendars. The handling of disparate fiscal calendars is accomplished by referring to a base calendar instead of the separate calendars used by each entity. A novel Time dimension and a novel Balance and Value dimension are defined for use in the accounting cube.

Although the invention has been described herein with respect to a particular implementation, it should be appreciated that numerous modifications and adaptations can be made thereto without departing from the scope of the invention as set forth in the following claims.

What is claimed is:

1. A method of operating a computer system to manage accounting information of entities having different fiscal calendars, comprising the steps of:
   receiving in said computer system a user input requesting consolidated accounting information for at least two entities that maintain separate accounting data according to respective calendars;
   mapping calendar information of said entities to a base calendar maintained in said computer system; and
   using calendar elements from said base calendar instead of calendar elements from the entity calendars to recover accounting information from the entities' separate and respective accounting data, for a specified time period, to provide said requested consolidated accounting information for the entities.

2. A method in accordance with claim 1 wherein the calendar information for at least two of said entities is based on a different fiscal year.

3. A method in accordance with claim 2 wherein said mapping step and use of said base calendar are performed by said computer system in a manner that is transparent to a user requesting said consolidated accounting information.

4. A method in accordance with claim 1 comprising the further steps of:
consolidating the recovered accounting information for the entities; and
reporting the consolidated information to a user.

5. A method in accordance with claim 4 wherein the consolidated information comprises a consolidation for said specified time period of at least one of net income and retained earnings for the entities.

6. A method in accordance with claim 4 wherein said computer system provides on-line analytical processing and consolidation of said accounting information in response to user inputs.

7. A method in accordance with claim 6 wherein said mapping step and use of said base calendar are performed by said computer system in a manner that is transparent to a user.

8. A computer system for managing accounting information of entities having different fiscal calendars, comprising:
memory for storing accounting data for at least two entities, each of said entities maintaining separate accounting data according to respective calendars;
a user interface for enabling a user to request consolidated accounting information for said entities;
means for mapping calendar information maintained according to the respective calendars of said entities to a base calendar maintained in said computer system; and
a processor for accessing accounting information from the entities' separate and respective accounting data according to said base calendar instead of the entity calendars to recover, for a specified time period, each entities' accounting information responsive to a user request entered via said user interface; and
wherein said processor consolidates the separate accounting information for said different entities according to said base calendar.

9. A computer system in accordance with claim 8 wherein the calendar information for at least two of said entities is based on a different fiscal year.

10. A computer system in accordance with claim 9 wherein said mapping means and processor correlate the different fiscal years to said base calendar for presentation in a manner that is transparent to a user requesting said consolidated accounting information.

11. A computer system in accordance with claim 8 wherein said processor is responsive to a user input received via said user interface for consolidating the recovered accounting information for the entities and reporting the consolidated information to a user.

12. A computer system in accordance with claim 11 wherein the consolidated information comprises a consolidation for said specified time period of at least one of net income and retained earnings for the entities.

13. A computer system in accordance with claim 11 wherein said processor provides on-line analytical processing and consolidation of said accounting information in response to user inputs.

14. A computer system in accordance with claim 13 wherein said mapping means and processor correlate the different fiscal years to said base calendar for presentation in a manner that is transparent to a user requesting said consolidated accounting information.

* * * * *